(12) United States Patent
Gutenev

(10) Patent No.: US 7,437,016 B2
(45) Date of Patent: Oct. 14, 2008

(54) IMAGE ENHANCEMENT

(75) Inventor: Alexander Gutenev, North Narrabeen (AU)

(73) Assignee: Polartechnics Limited (AU)

( * ) Notice: Subject to any disclaimer, the term of this patent is extended or adjusted under 35 U.S.C. 154(b) by 1437 days.

(21) Appl. No.: 10/269,810

(22) Filed: Oct. 11, 2002

(65) Prior Publication Data

US 2003/0086607 A1 May 8, 2003

(30) Foreign Application Priority Data

Oct. 15, 2001 (AU) .................... PR8272

(51) Int. Cl.
G06K 9/40 (2006.01)
(52) U.S. Cl. .................... 382/274; 382/167
(58) Field of Classification Search ............ 382/162, 382/166, 167, 168, 255, 274; 209/577, 576, 209/580, 587, 938; 358/518
See application file for complete search history.

(56) References Cited

U.S. PATENT DOCUMENTS

| | | | |
|---|---|---|---|
| 4,884,130 A * | 11/1989 | Huntsman | 358/518 |
| 6,115,496 A * | 9/2000 | Nguyen et al. | 382/166 |
| 6,410,872 B2 * | 6/2002 | Campbell et al. | 209/577 |
| 6,870,962 B2 * | 3/2005 | Lee et al. | 382/248 |

OTHER PUBLICATIONS

Czerwinski et al., "Linear Feature Enhancement by False Color", IEEE, vol. 2, Nov. 1996, pp. 1427-1431.*
R. C. Gonzalez et al., *Digital Image Processing,* The Image Processing Handbook, 2nd Edition, CRC Press, pp. 173-181.

* cited by examiner

*Primary Examiner*—Anh Hong Do
(74) *Attorney, Agent, or Firm*—Gottlieb, Rackman & Reisman, P.C.

(57) ABSTRACT

An image (300) comprising a plurality of image elements defined by a first set of vectors in a first color space is enhanced by calculating a principal component transform from the image elements (step 830). The image (300) is converted (step 310) to a second color space such as HSI wherein the image elements are defined by a second set of vectors having an intensity component. A principal component value is calculated for each of the image elements using the principal component transform, and the intensity component of the second set of vectors is replaced (step 840) with the principal component value to produce an enhanced image. The enhanced image may be converted back to the first color space for display on a suitable display device.

16 Claims, 10 Drawing Sheets

IMAGE ENHANCEMENT

FIELD OF INVENTION

The present invention relates generally to image processing and, in particular, to enhancing the contrast of an image.

BACKGROUND ART

It is often necessary to apply enhancement techniques to images. Enhancement may be desirable to improve the appearance of an image for a human observer, or may be required to make the image more suitable for further processing.

An image may suffer from low contrast. The low contrast can result, for example, from poor matching of sensor dynamic range to object illumination, lack of dynamic range in a sensor with which the image was captured, or incorrect settings of the sensor. Even when automatic gain control techniques are used, an image may exhibit a low dynamic range. This may result from system users seeking to ensure that the maximum range of a display device is not exceeded.

An image with low contrast may appear murky and uninteresting to an observer. Where the image is an input to image analysis techniques such as recognition or feature extraction, the low contrast may limit the effectiveness of the image analysis.

FIG. 1 shows an example of an image 100 having low contrast. The image 100 shows a skin lesion 110 and an area of surrounding skin 120. The lesion 110 is to be analysed for the possible presence of malignant melanoma. Techniques to be applied to the image 100 include image segmentation into regions designated 'lesion' and 'non-lesion' and subsequent extraction of features relating to colour, shape, texture and symmetry of the lesion 110. The areas 130 in the corner of the image 100 are regions of standard colour for use in calibration of the image 100. The image 100 is described in RGB colour space in which the value of each pixel is defined by the (R, G, B) triplet where R is the red component, G is the green component and B is the blue component of the pixel colour. Typically, each colour component is stored as 8 bits, providing a range of [0,255] for each colour. Although image 100 is a colour image, it is illustrated in FIG. 1 as a grey-scale image for ease of reproduction.

A convenient measure of intensity or luminance is:

$$\text{intensity} = \tfrac{1}{3}(R+G+B)$$

FIG. 2 shows a histogram 200 of the intensity values of the pixels of the image 100 shown in FIG. 1. The x-axis 210 of the histogram 200 covers the full range of intensity values [0,255]. The y-axis 220 of the histogram 200 shows the number of pixels in the image 100 having the corresponding intensity shown on the x-axis 210. It may be seen that the histogram 200 only covers about two thirds of the full range of intensity values and that most of the intensity values fall in the range from about 100 to 127.

A known technique for enhancing the contrast of an image is histogram stretching. While it would be possible to apply histogram stretching to each of the three colour components R, G and B, the resultant change in the relative proportion of each colour would give unacceptable results. Instead, it is common to apply histogram stretching to the intensity component of the image, as defined above.

FIG. 3 shows a flow chart of a conventional image enhancement technique using histogram stretching. The input to the method is an image 300 defined in RGB colour space. In method step 310 the image 300 is converted from RGB space to HSI colour space.

In the HSI colour model, each pixel of the image is defined in terms of Hue (H), Saturation (S) and Intensity (I). The hue is a colour attribute that describes a pure colour such as red, and the saturation is a measure of the extent to which the pure colour is diluted by white light. The hue and saturation components are closely related to the ways in which a human observer perceives colour. One of the main advantages of working with the HSI colour model is that the intensity component is decoupled from the colour information in an image, in contrast with models such as the RGB colour space.

The result of method step 310 is a description 320 of the image in HSI space.

In step 330 histogram stretching is performed on the intensity component of the image description 320. Each element of the intensity histogram is mapped to an output element by means of a predefined transform. The result is to spread the intensity histogram over the entire range [0,255].

In step 340 the intensity component of the image description 320 is replaced with the intensity component as stretched in step 330.

In step 350 the image is converted back into RGB space, yielding the enhanced image 360. The image 360 may be displayed on a suitable display device or may be used as an input to further processing.

FIGS. 4 and 5 illustrate the method of FIG. 3 as applied to the image 100 shown in FIG. 1. FIG. 4 shows the enhanced image 400. A comparison with FIG. 1 shows that the enhanced image 400 has greater luminance than the image 100 and has a greater dynamic range. Although image 400 is a colour image, it is illustrated in FIG. 4 as a grey-scale image for ease of reproduction This is further illustrated in FIG. 5, which shows an intensity histogram 500 corresponding to the enhanced image 400. The x-axis 210 covers the full dynamic range [0,255] and the y-axis 520 shows the number of pixels in image 400 having a particular intensity value. A comparison of the histogram 500 and the histogram 200 shows that the intensity has been shifted towards the bright end of the scale and covers the entire dynamic range.

Histogram stretching has certain drawbacks. The increase in dynamic range may cause false contours in the image because the stretched histogram contains gaps where there are missing grey levels. This is illustrated in FIGS. 6 and 7. FIG. 6 shows a detail 600 of the histogram 200 corresponding to the input image 100. The x-axis 610 only covers a portion of the full dynamic range. The y-axis 620 shows the number of pixels in the image 100 having the indicated intensity.

FIG. 7 shows a detail 700 of the histogram 500 corresponding to the enhanced image 400. The x-axis of 710 of histogram 700 only shows the range of intensity values from 140 to 162. It may be seen that the histogram 700 contains gaps. The gaps mean that the histogram 700 contains many false local extrema. This may cause problems in automatic processing of the image or the histogram, for example in a search for a global maximum or global minimum.

A known variation of histogram stretch methods is histogram equalisation. Details may be found in textbooks such as 'The Image Processing Handbook' by John C. Russ ($3^{rd}$ edition, CRC Press 1999). Histogram equalisation gives the best visible results in HSI colour space when only histograms of intensity and saturation are manipulated since the human eye is highly sensitive to changes in hue.

There is thus a need for a technique to enhance the contrast of an image while avoiding shortcomings of the histogram stretching methods.

SUMMARY OF THE INVENTION

According to a first aspect of the invention there is provided a method for enhancing an image comprising a plurality of image elements defined by a first set of vectors in a first colour space, the method comprising the steps of:

calculating a principal component transform from said image elements;

converting said image to a second colour space wherein said image elements are defined by a second set of vectors having an intensity component;

calculating a principal component value for each of said image elements from said principal component transform; and replacing the intensity component of said second set of vectors with said principal component value to produce an enhanced image According to a second aspect of the invention there is provided apparatus for enhancing an image comprising a plurality of image elements defined by a first set of vectors in a first colour space, the apparatus comprising:

means for calculating a principal component transform from said image elements;

means for converting said image to a second colour space wherein said image elements are defined by a second set of vectors having an intensity component;

means for calculating a principal component value for each of said image elements from said principal component transform; and means for replacing the intensity component of said second set of vectors with said principal component value to produce an enhanced image.

BRIEF DESCRIPTION OF THE DRAWINGS

One or more embodiments of the present invention will now be described with reference to the drawings, in which.

DETAILED DESCRIPTION INCLUDING BEST MODE

Figure 1:
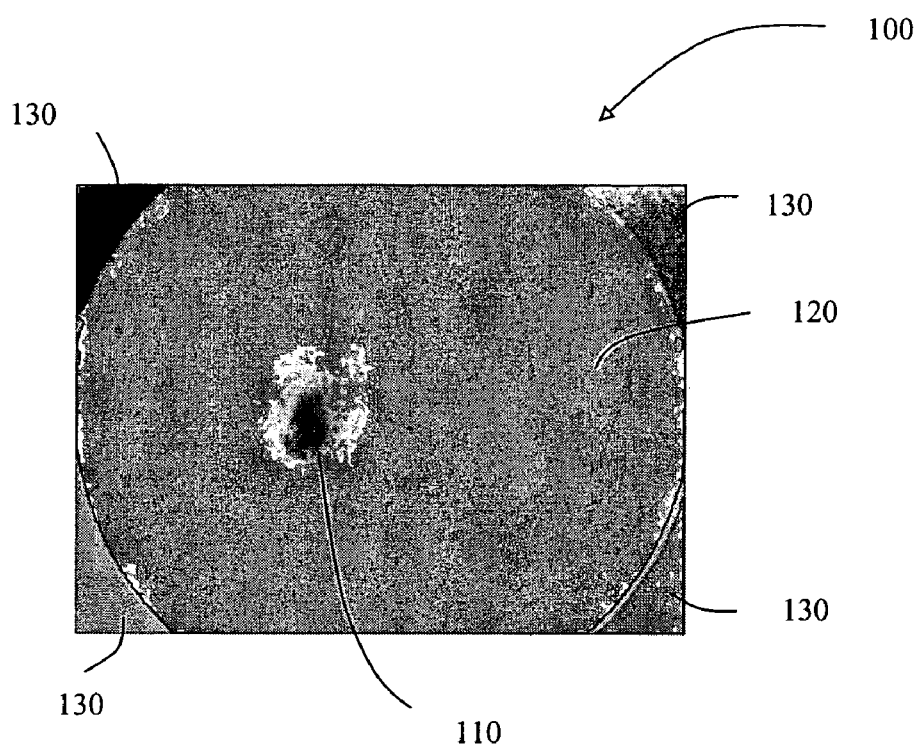
FIG. 1 is a low-contrast image of a skin lesion used for illustrative purposes.
Figure 2:
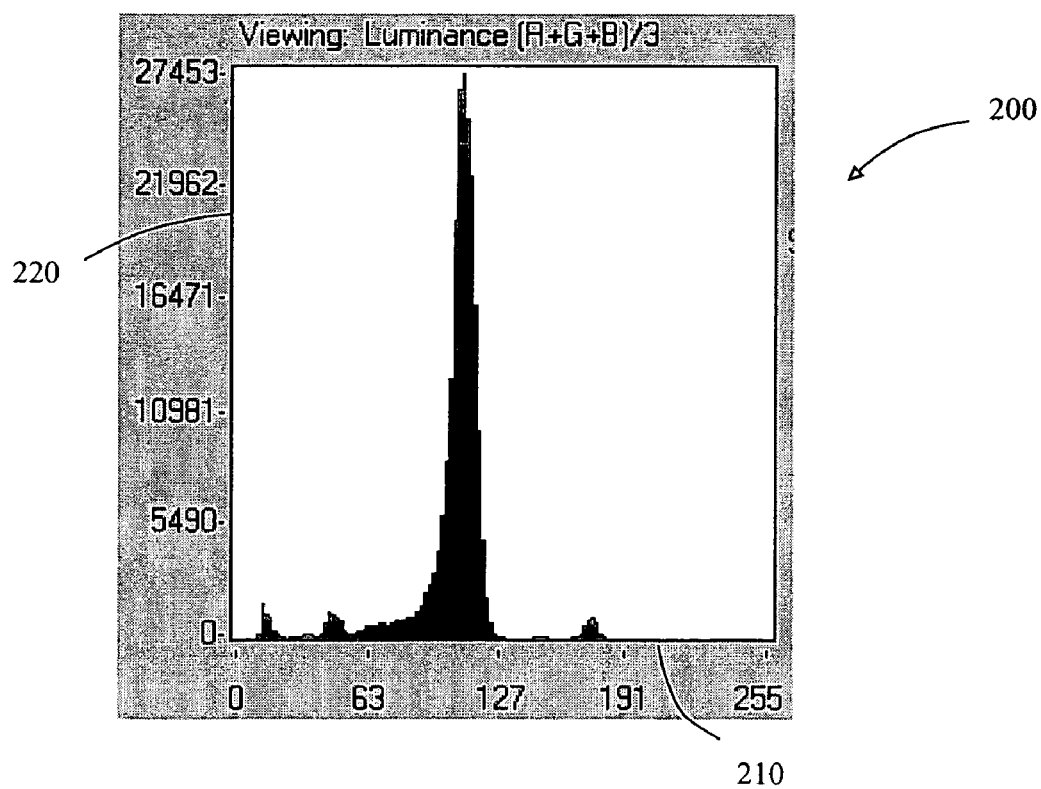
FIG. 2 shows a histogram of intensity values in the image of FIG. 1.
Figure 3:
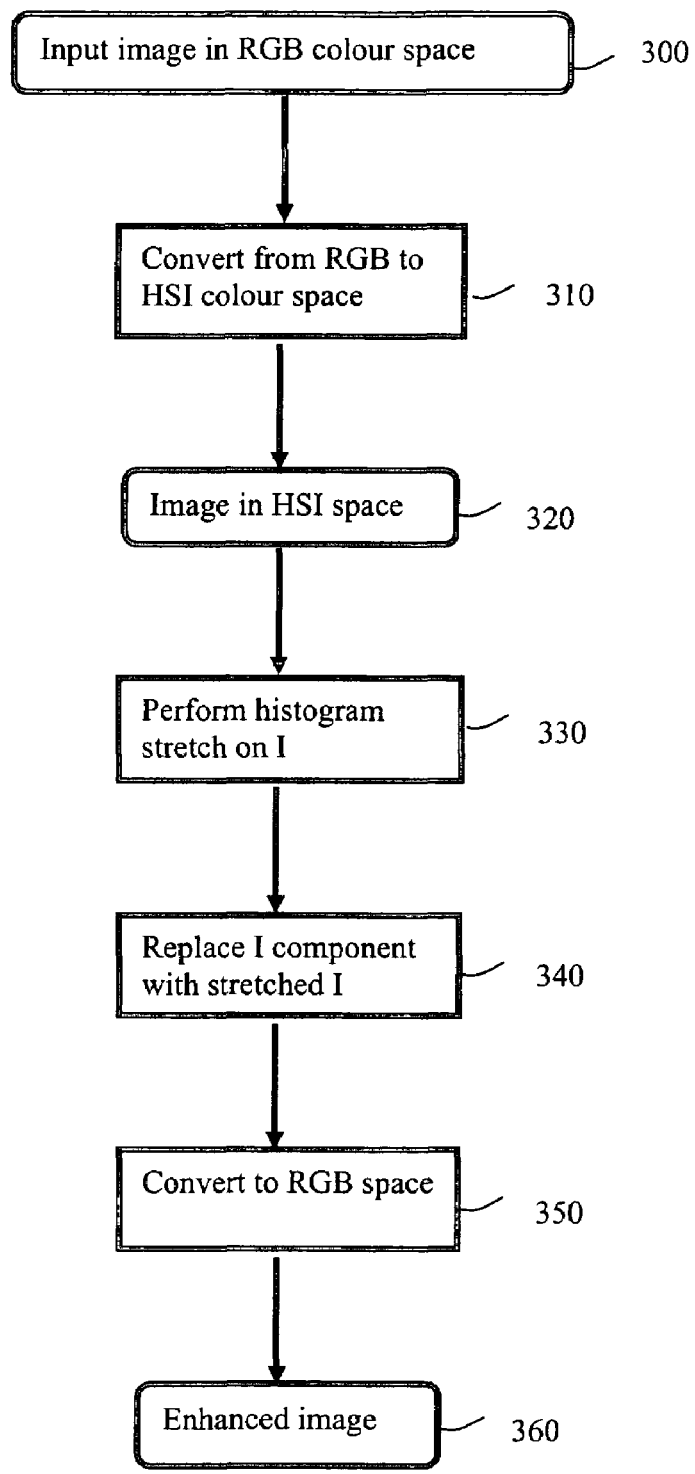
FIG. 3 shows a flow diagram of the known method of intensity histogram stretching.
Figure 4:
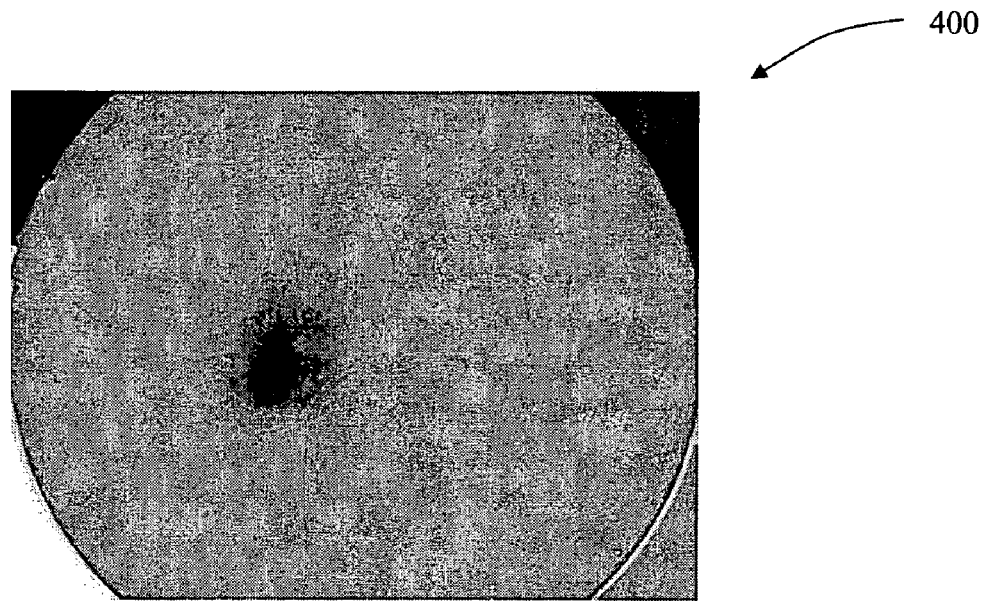
FIG. 4 shows the image of FIG. 1 enhanced by the method of FIG. 3.
Figure 5:
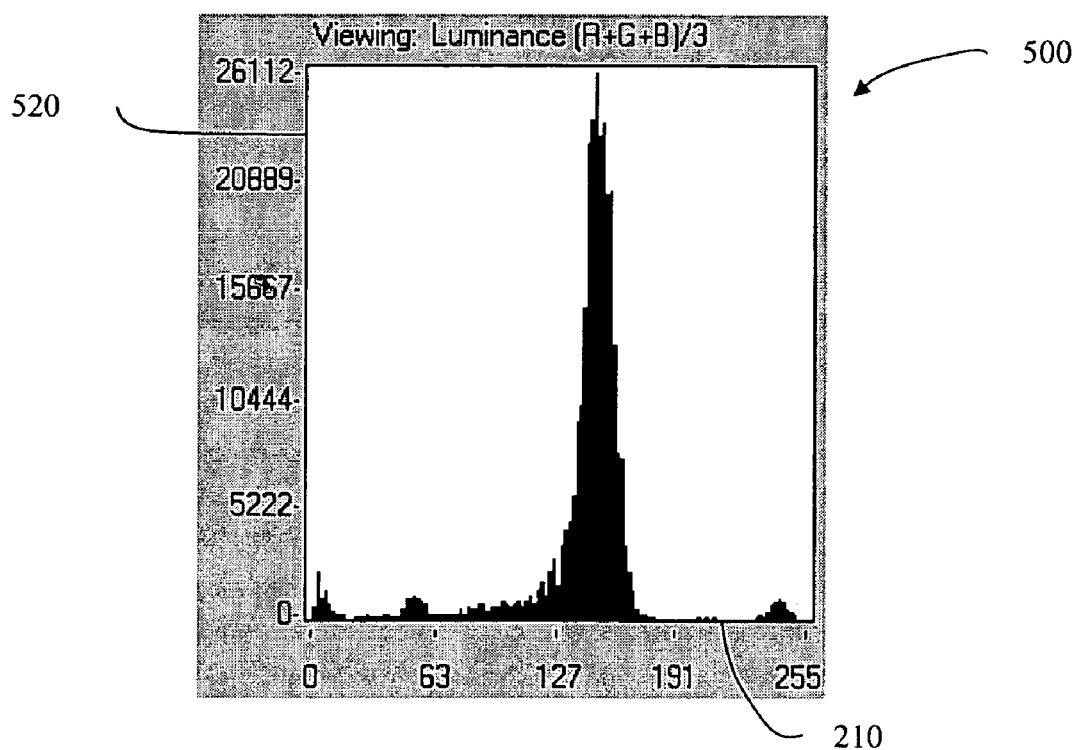
FIG. 5 shows a histogram of intensity values in the image of FIG. 4.
Figure 6:
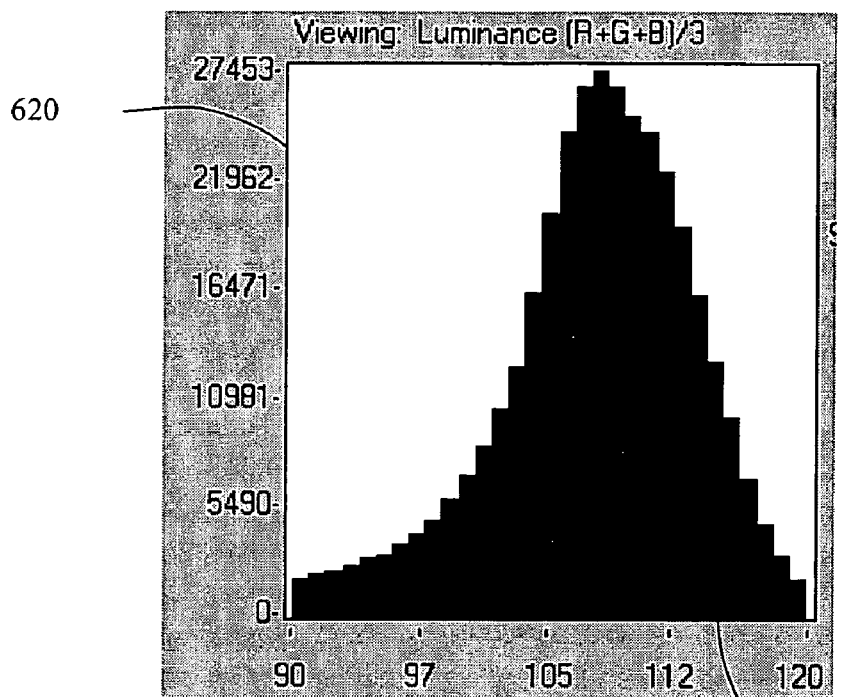
FIG. 6 shows a detail of the histogram of FIG. 2.
Figure 7:
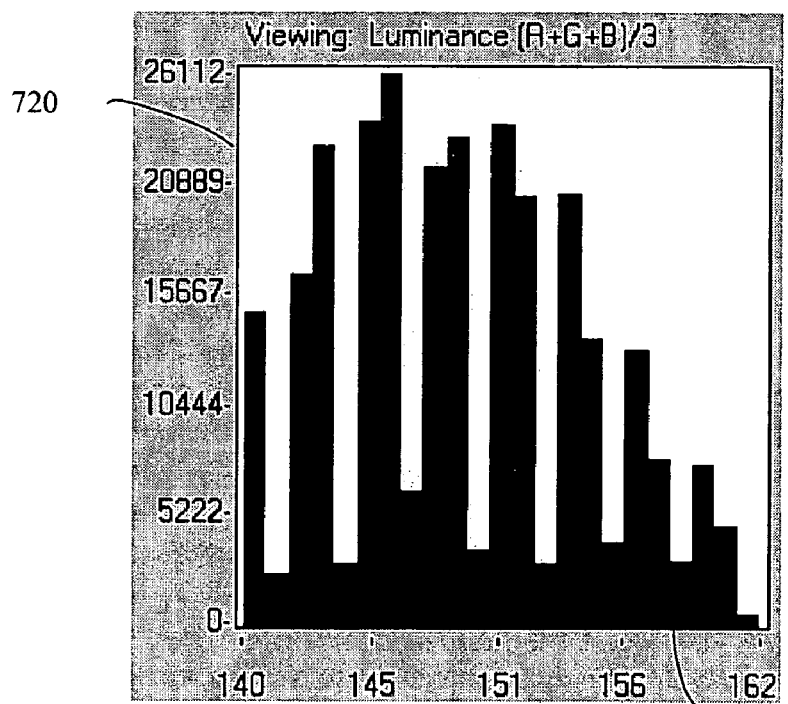
FIG. 7 shows a detail of the histogram of FIG. 5.

Where reference is made in any one or more of the accompanying drawings to steps and/or features which have the same reference numerals, those steps and/or features have for the purposes of this description the same function(s) or operation(s), unless the contrary intention appears.

Figure 8:
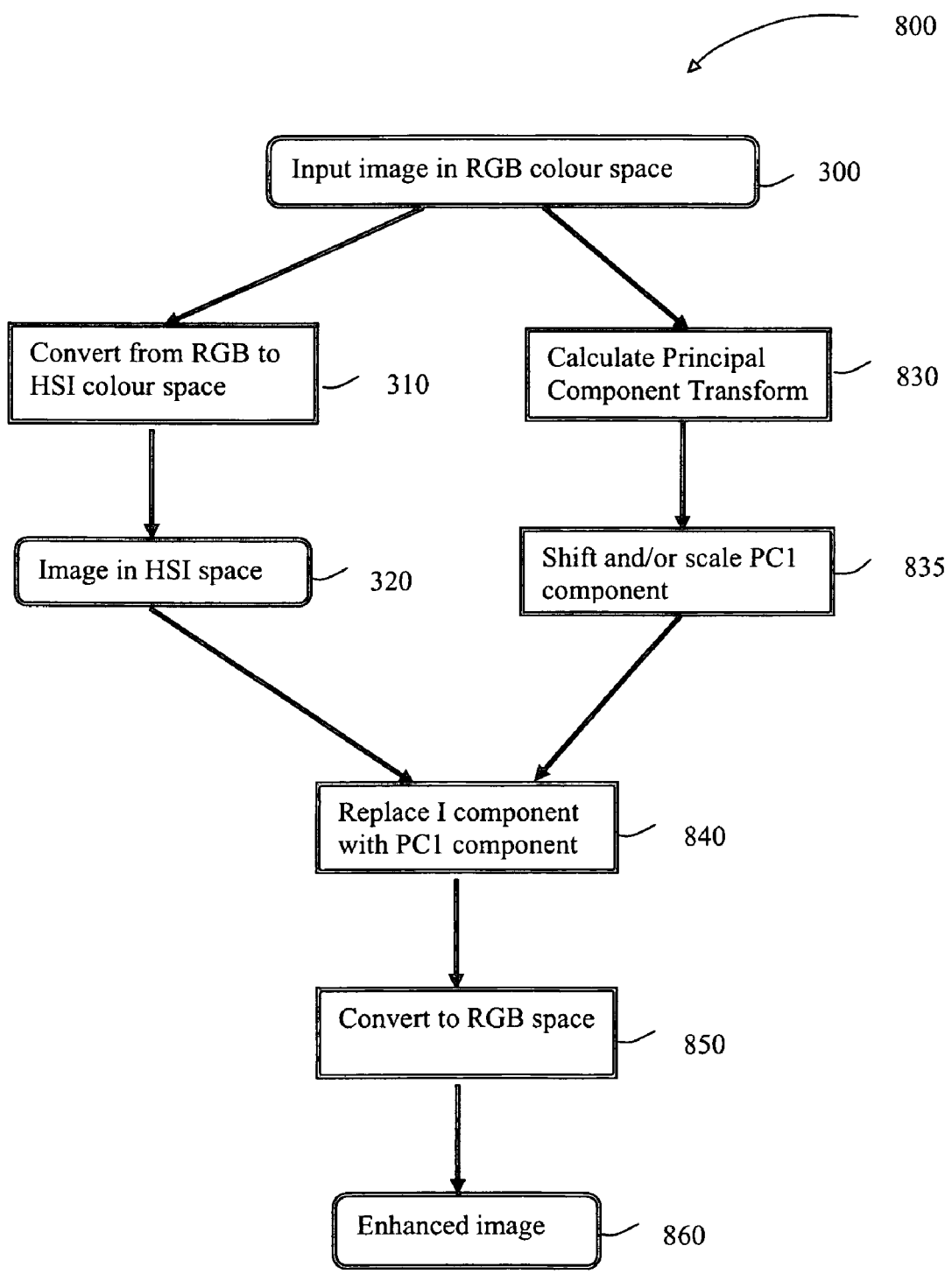
FIG. 8 shows a flow diagram of an enhancement technique using principal component analysis.

FIG. 8 shows a flow diagram of an enhancement method 800 that replaces the intensity component of a colour image with the principal component value of the colour image.

The input to the method 800 is an image 300 defined in RGB colour space. Since image enhancement is more conveniently processed in the HSI colour space due to minimal perceived colour distortion, in method step 310 the input image 300 is converted from RGB to a description in HSI space. The output of step 310 is an image description 320 in HSI space. As described above, the hue (H) and saturation (S) components relate to the colour of the image while the intensity (I) component is decoupled from the colour information of the image.

In step 830, a principal component (PC) analysis of the image 300 is performed. In the flow diagram of FIG. 8, method step 830 is shown as occurring in parallel to method step 310. Such a configuration is suitable for implementation in a distributed computing environment. However, where a single computer processor is used, method steps 310 and 830 may be performed sequentially. As the method steps 310 and 830 are independent of one another, steps 310 and 830 may be performed in any order.

The principal component transform calculated in step 830 is sometimes referred to as a Hotelling transform and defines a new set of orthonormal axes dependent on the statistical properties of the input data.

The first principal component axis (PC1) is in the direction of maximum variance in the input data. The second PC axis (PC2) captures most of the remaining variance, and any further principal component axes cater for any data falling outside the plane defined by the PC1 and PC2 axes. In the present instance where input data is defined in RGB space, there are three principal components.

The principal component transform is calculated from the eigenvectors of the covariance matrix of the input data. The transform may be calculated using commercially available software, for example Statistica™, produced by StatSoft Inc. of Tulsa, Okla., USA, or Matlab™ produced by MathWorks Inc. of Natick, Mass., USA.

The principal component transform may be described by the following equation:

$$pc = A(x - m_x)$$

where x is an input vector, $(R, G, B)^T$;

$m_x$ is the mean vector of all the input data, i.e. the average RGB level of the image;

pc is an output vector (PC1, PC2, PC3) in the space defined by the principal component axes; and A is a matrix whose rows are the eigenvectors of C, the covariance matrix of the input data.

As an example, consider an arbitrary point z in the input image 300. Point z is described by a vector $(R_z, G_z, B_z)$ in RGB colour space and by a vector $(H_z, S_z, I_z)$ in HSI space, where $$I_z = \frac{1}{3}(R_z + G_z + B_z).$$

The PC1 value of the point z may be calculated from $$PC1_z = e_1 R_z + e_2 G_z + e_3 B_z - (e_1, e_2, e_3) \cdot m_x$$

where $(e_1, e_2, e_3)$ is the first row of A, i.e. the eigenvector corresponding to the largest eigenvalue of C. The further steps of the method make use of the calculated PC1 values, but do not use the PC2 and PC3 values.

Figure 13A:
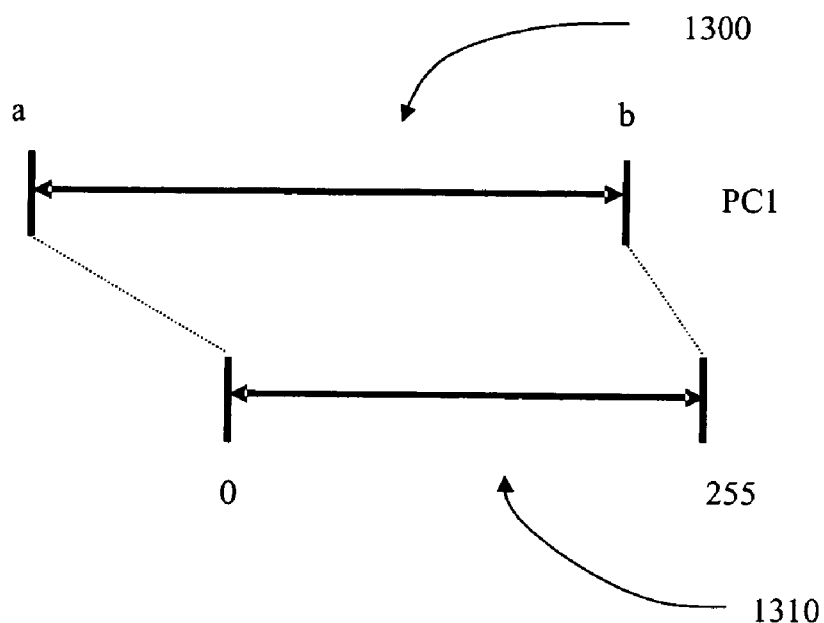
FIGS. 13A and 13B illustrate the shifting and scaling of the first principal component value to fit a defined dynamic range.

Once the principal component transform has been calculated, in step 835 the PC1 component is shifted and/or scaled to fit a predefined dynamic range. When the enhanced image is to be presented on a computer screen, which normally uses eight bits to define each colour component, it may be necessary to shift and/or scale the dynamic range of the PC1 value to fit into the range [0,255]. The dynamic range of the PC1 component prior to adjustment can stretch from negative values to positive values. This is illustrated in FIG. 13A. The PC1 value calculated in step 830 is shown as having a range 1300 stretching from a minimum value of a to a maximum value of b. The range 1300 may not map onto the required maximum range 1310 stretching from a minimum of 0 to a maximum of 255. If necessary, the range 1300 is shifted and/or scaled to fit the desired range 1310.

Figure 13B:
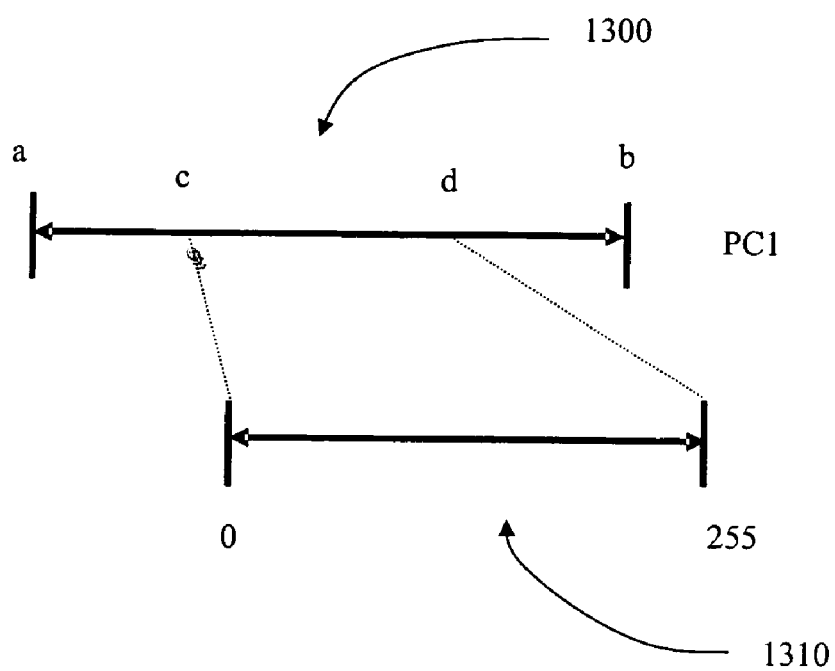

Alternatively, a portion of the range of PC1 can be mapped to the range [0,255]. This is illustrated in FIG. 13B. The PC1 value has a range 1300 stretching from a minimum of a to a maximum of b. A portion of the range 1300 lying between c and d may be shifted and/or stretched to match the desired range 1310. In this way only part of PC1 corresponding to a percentage of the pixels of input image 300 is mapped to the full display range 1310. Values in the ranges ac and db are clamped to constant values.

Once the dynamic range of the PC1 component has been mapped to the desired range, in step 840 the description of each point z in image 320, $(H_z, S_z, I_z)$, is replaced by $(H_z, S_z, PC1_z)$ for all points z, where $PC1_z$ is the first principal component value as mapped to the desired dynamic range. Next, the image description is converted back to RGB space in step 850, yielding the enhanced image 860. The enhanced image 860 may be displayed on a suitable display device or may be used in further processing.

Figure 9:
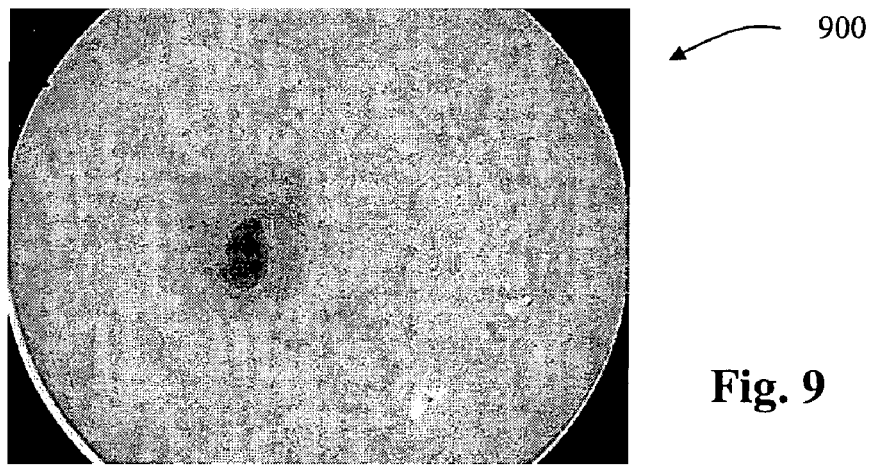
FIG. 9 shows the image of FIG. 1 as enhanced by the method of FIG. 8.
Figure 10:
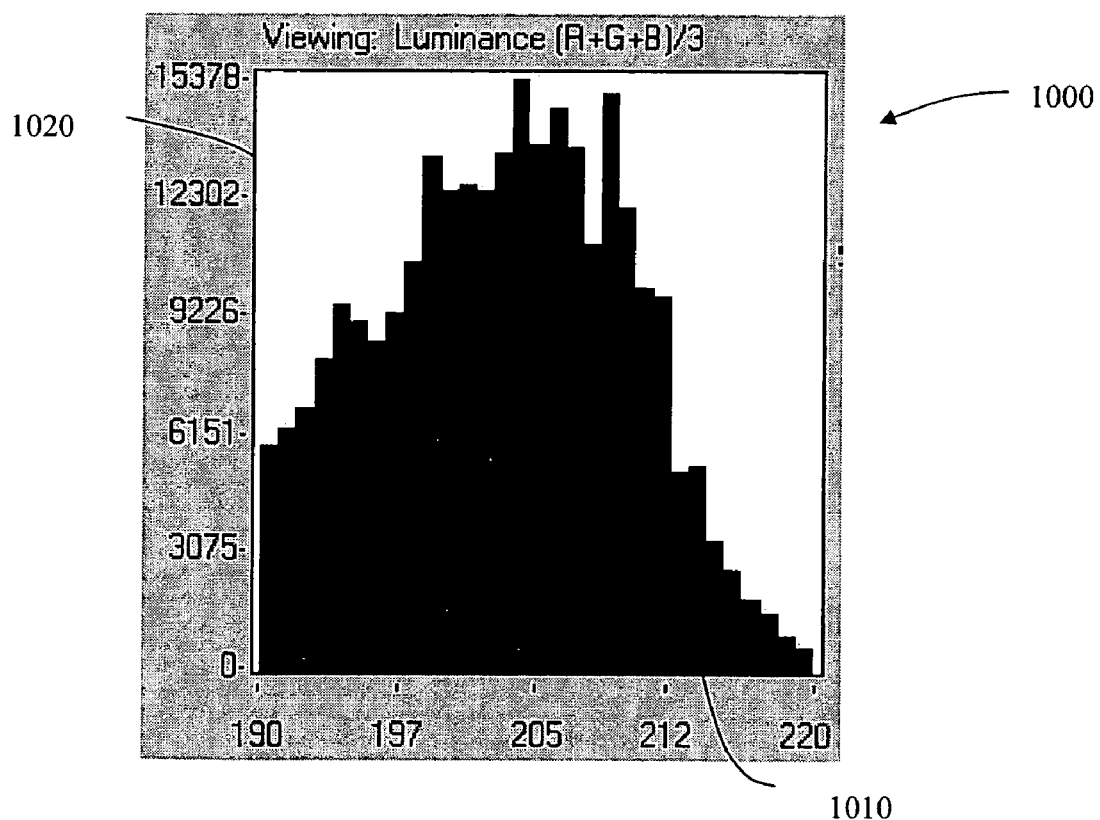
FIG. 10 shows a histogram of intensity values corresponding to the image of FIG. 9.

FIGS. 9 and 10 show the results of the method of FIG. 8 being applied to the image 100 of FIG. 1. The enhanced image 900 is lighter in appearance than the image 100 and has a greater dynamic range. However, because the hue and saturation components of the image were left unchanged, the relative proportions of the colour components are not affected. Although image 900 is a colour image, it is illustrated in FIG. 9 as a grey-scale image for ease of reproduction FIG. 10 shows an intensity histogram 1000 of the image 900. The x-axis 1010 of the histogram 1000 does not show the entire dynamic range but instead shows detail of intensity values between 190 and 220. The histogram 1000 does not exhibit the gaps seen in the histogram 700 that resulted from the histogram stretching.

Figure 11:
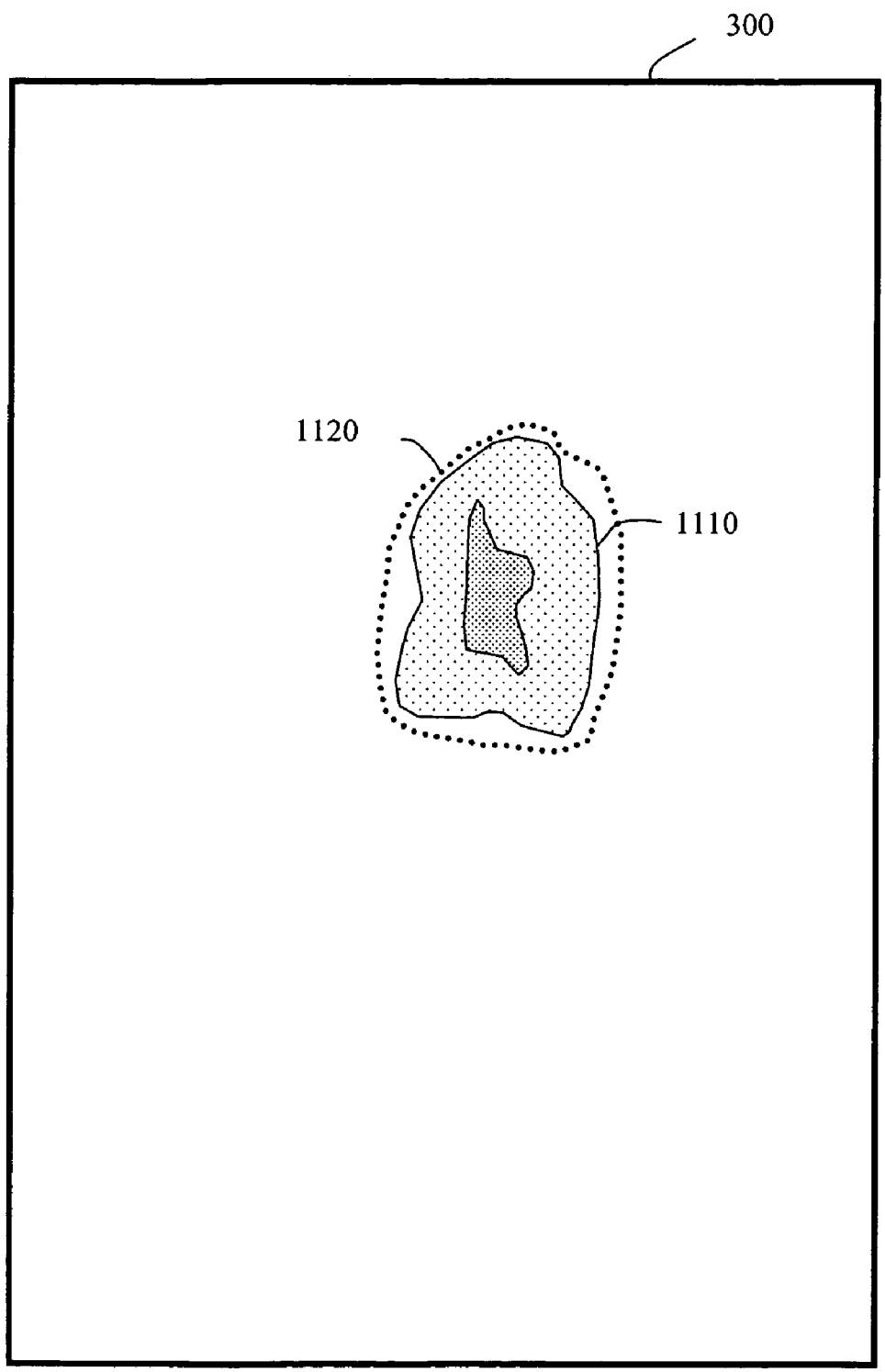
FIG. 11 illustrates contrast enhancement based on a portion of an image.

The principal component transform need not be calculated using the entire input image 300. As an example, FIG. 11 shows an input image 300 containing an object 1110. A region of interest 1120 is defined, enclosing a selected portion of the input image 300. The principal component transform may be calculated using information in the region of interest 1120 rather than the entire input image 300.

Figure 12:
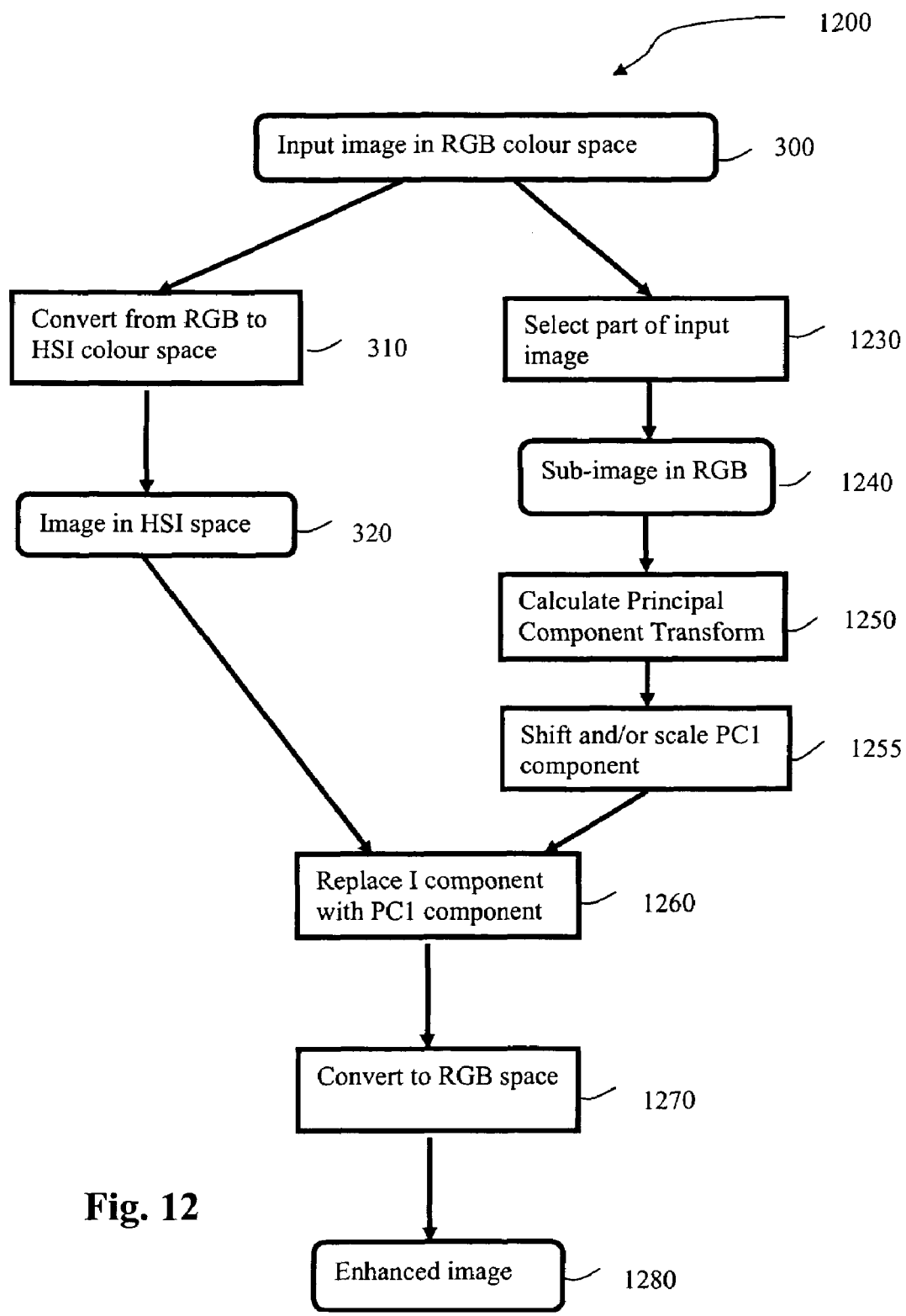
FIG. 12 shows a flow diagram of an enhancement method based on a selected portion of an input image.

This is illustrated in the flow diagram of FIG. 12 for a method 1200. In step 310 an input image 300 in RGB colour space is converted from RGB to HSI colour space, yielding an image description 320 in HSI space.

In step 1230 a portion of the input image 300 is selected, defining a sub-image 1240 in RGB space. In step 1250 a principal component transform of the sub-image 1240 is calculated. Next, in step 1255, the first principal component, PC1, is shifted and/or scaled as necessary to fit a predefined range. The range is [0,255] where the colour components are stored as 8-bits. The procedure for modifying the dynamic range of the PC1 component is described in more detail above with reference to FIGS. 13A and 13B.

In FIG. 12, method step 310 is illustrated as occurring in parallel to method steps 1230, 1250 and 1255. This arrangement is suitable where distributed computing facilities are used. However, where a single processor is used, method steps 310, 1230, 1250 and 1255 may be performed sequentially.

In step 1260 the I component of the image description 320 is replaced with the PC1 component calculated in steps 1250 and 1255. Next, in step 1270, the image description is converted back to RGB space, yielding the enhanced image 1280. The image 1280 may be displayed on a suitable display device or may be used in further processing.

The foregoing describes only some embodiments of the present invention, and modifications and/or changes can be made thereto without departing from the scope and spirit of the invention, the embodiments being illustrative and not restrictive. For example, if the colours are stored in higher precision than is possible using eight bits, the described maximum range of [0,255] may be increased to correspond to the greater colour resolution. In addition, the input image may be described in other uniform colour spaces such as CMY and XYZ. Perceptually uniform spaces such as Lab or Luv should be converted to a uniform space prior to application of the method.

Figure 14:
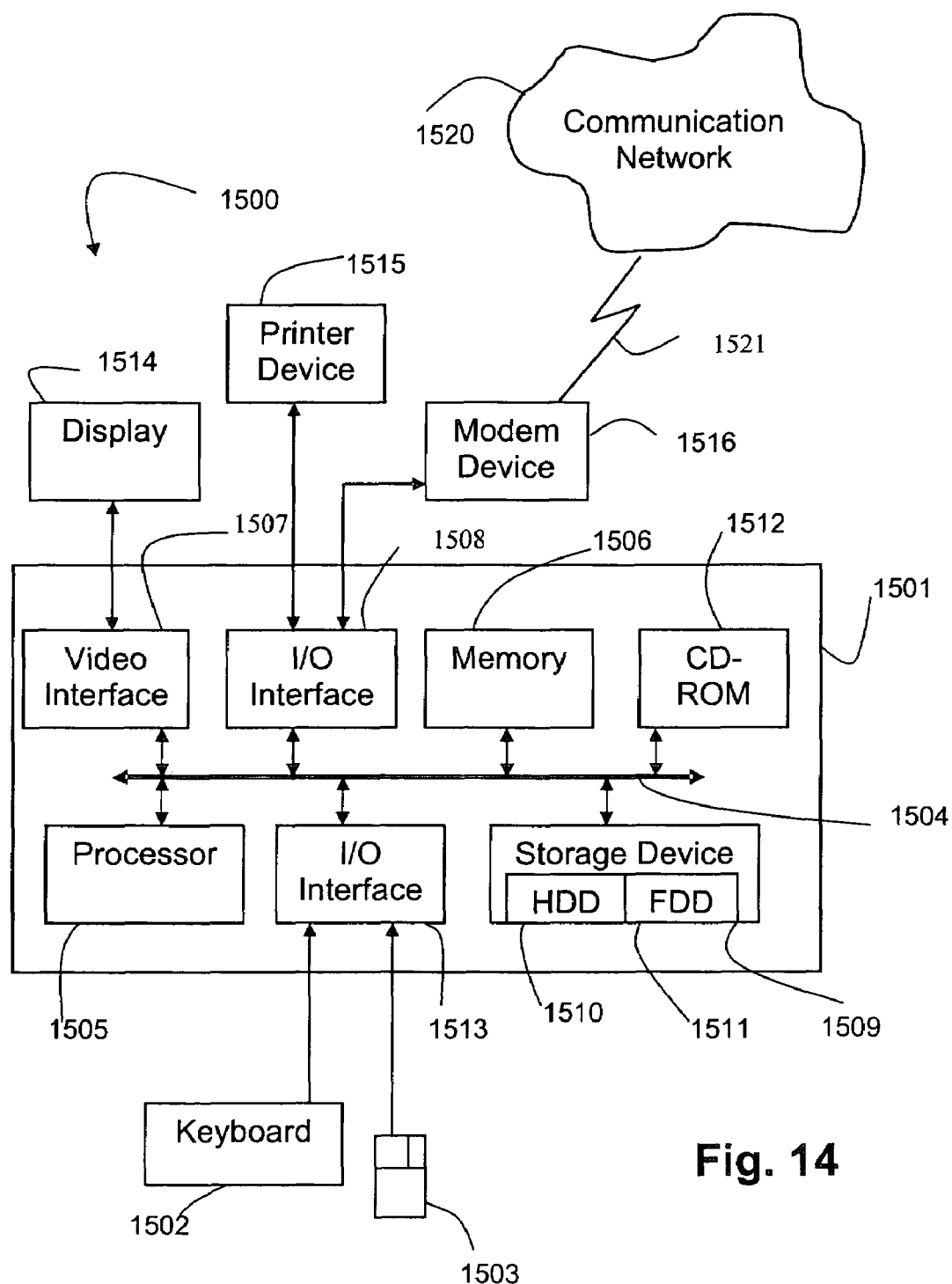
FIG. 14 is a schematic block diagram of a general purpose computer upon which the described techniques can be practiced.

The various methods 800, 1200 and 1400 of image enhancement are preferably practiced using a general-purpose computer system 1500, such as that shown in FIG. 14 wherein the processes of FIGS. 8 and 12 may be implemented as software, such as an application program executing within the computer system 1500. In particular, the method steps are effected by instructions in the software that are carried out by the computer. The instructions may be formed as one or more code modules, each for performing one or more particular tasks. The software may also be divided into two separate parts, in which a first part performs the image enhancement methods and a second part manages a user interface between the first part and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for image enhancement.

The computer system 1500 comprises a computer module 1501, input devices such as a keyboard 1502 and mouse 1503, output devices including a printer 1515 and a display device 1514. A Modulator-Demodulator (Modem) transceiver device 1516 is used by the computer module 1501 for communicating to and from a communications network 1520, for example connectable via a telephone line 1521 or other functional medium. The modem 1516 can be used to obtain access to the Internet, and other network systems, such as a Local Area Network (LAN) or a Wide Area Network (WAN).

The computer module 1501 typically includes at least one processor unit 1505, a memory unit 1506, for example formed from semiconductor random access memory (RAM) and read only memory (ROM), input/output (I/O) interfaces including a video interface 1507, and an I/O interface 1513 for the keyboard 1502 and mouse 1503 and optionally a joystick (not illustrated), and an interface 1508 for the modem 1516. A storage device 1509 is provided and typically includes a hard disk drive 1510 and a floppy disk drive 1511. A magnetic tape drive (not illustrated) may also be used. A CD-ROM drive 1512 is typically provided as a non-volatile source of data. The components 1505 to 1513 of the computer module 1501, typically communicate via an interconnected bus 1504 and in a manner which results in a conventional mode of operation of the computer system 1500 known to those in the relevant art. Examples of computers on which the described arrangements can be practised include IBM-PCs and compatibles, Sun Sparcstations or alike computer systems evolved therefrom. Other computing arrangements may alternatively be used.

Typically, the application program is resident on the hard disk drive 1510 and read and controlled in its execution by the processor 1505. Intermediate storage of the program and any data fetched from the network 1520 may be accomplished using the semiconductor memory 1506, possibly in concert with the hard disk drive 1510. In some instances, the application program may be supplied to the user encoded on a CD-ROM or floppy disk and read via the corresponding drive 1512 or 1511, or alternatively may be read by the user from the network 1520 via the modem device 1516. Still further, the software can also be loaded into the computer system 1500 from other computer readable media. The term "computer readable medium" as used herein refers to any storage or transmission medium that participates in providing instructions and/or data to the computer system 1500 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 1501. Examples of transmission media include radio or infra-red transmission channels as well as a network connection to another computer or networked device, and the Internet or Intranets including email transmissions and information recorded on websites and the like.

The method of image enhancement may alternatively be implemented in dedicated hardware. Such dedicated hardware may include graphic processors, digital signal processors, or one or more microprocessors and associated memories.

Australia Only

In the context of this specification, the word "comprising" means "including principally but not necessarily solely" or "having" or "including" and not "consisting only of". Variations of the word comprising, such as "comprise" and "comprises" have corresponding meanings.

I claim:

1. A method for enhancing an image comprising a plurality of image elements defined by a first set of vectors in a first colour space, the method comprising the steps of:

calculating a principal component transform from said image elements;

converting said image to a second colour space wherein said image elements are defined by a second set of vectors having an intensity component;

calculating a principal component value for each of said image elements from said principal component transform; and replacing the intensity component of said second set of vectors with said principal component value to produce an enhanced image.

2. A method as claimed in claim 1 comprising the further step of converting said enhanced image back to said first colour space.

3. A method as claimed in claim 1 wherein said principal component transform is calculated from a sub-set of said image elements corresponding to a selected region of said image.

4. A method as claimed in claim 1 wherein said principal component values corresponding to said image elements are shifted and, if necessary, scaled to fit into a predefined range.

5. A method as claimed in claim 3, wherein those of said principal component values that correspond to said sub-set of image elements are shifted and, if necessary scaled to fit into a predefined range.

6. A method as claimed in claim 1 wherein said first colour space is an RGB colour space.

7. A method as claimed in claim 1 wherein said second colour space is an HSI colour space.

8. Apparatus for enhancing an image comprising a plurality of image elements defined by a first set of vectors in a first colour space, the apparatus comprising:

means for calculating a principal component transform from said image elements;

means for converting said image to a second colour space wherein said image elements are defined by a second set of vectors having an intensity component;

means for calculating a principal component value for each of said image elements from said principal component transform; and means for replacing the intensity component of said second set of vectors with said principal component value to produce an enhanced image.

9. Apparatus as claimed in claim 8, further comprising means for converting said enhanced image back to said first colour space.

10. Apparatus as claimed in claim 8, wherein said principal component transform is calculated from a sub-set of said image elements corresponding to a selected region of said image.

11. Apparatus as claimed in claim 8, wherein said principal component values corresponding to said image elements are mapped into a predefined range.

12. Apparatus as claimed in claim 10, wherein those of said principal component values that correspond to said sub-set of image elements are mapped to a predefined range.

13. Apparatus as claimed in claim 8, wherein said first colour space is an RGB colour space.

14. Apparatus as claimed in claim 8, wherein said second colour space is an HSI colour space.

15. A computer readable medium, having a program recorded thereon, where the program is configured to make a computer execute a procedure for enhancing an image, the procedure comprising the steps of:

calculating a principal component transform from said image elements;

converting said image to a second colour space wherein said image elements are defined by a second set of vectors having an intensity component;

calculating a principal component value for each of said image elements from said principal component transform; and replacing the intensity component of said second set of vectors with said principal component value to produce an enhanced image.

16. A computer readable medium according to claim 15 wherein, in said procedure, the principal component transform is calculated from a sub-set of said image elements corresponding to a selected region of said image.

* * * * *